(12) United States Patent
Kim

(10) Patent No.: US 7,125,170 B2
(45) Date of Patent: Oct. 24, 2006

(54) FLUID DYNAMIC BEARING MOTOR

(75) Inventor: Sang Uk Kim, Seoul (KR)

(73) Assignee: G & W Technologies, Inc., Incheon (KR)

( * ) Notice: Subject to any disclaimer, the term of this patent is extended or adjusted under 35 U.S.C. 154(b) by 104 days.

(21) Appl. No.: 10/982,083

(22) Filed: Nov. 4, 2004

(65) Prior Publication Data

US 2005/0094909 A1   May 5, 2005

(30) Foreign Application Priority Data

Nov. 5, 2003  (KR) .................... 10-2003-0078041

(51) Int. Cl.
*F16C 17/02*   (2006.01)

(52) U.S. Cl. .................... 384/115; 384/114; 384/292

(58) Field of Classification Search ........... 384/292, 384/115, 114, 113, 107
See application file for complete search history.

(56) References Cited

U.S. PATENT DOCUMENTS 5,273,368 A * 12/1993 Asada et al. ............... 384/113
5,516,213 A *  5/1996 Moriyama et al. ......... 384/292

* cited by examiner

*Primary Examiner*—Lenard A. Footland
(74) *Attorney, Agent, or Firm*—Thelen Reid & Priest LLP

(57) ABSTRACT

Provided is a fluid dynamic bearing motor in which a rotor is rotatably supported by forming an oil gap between the rotor and a stator to form a fluid dynamic pressure bearing and a plurality of oil grooves are formed in a surface of the rotor or stator forming the oil gap and facing each other. The oil grooves include a first oil groove inclined at a first angle with respect to a circumferential direction, and a second oil groove extending from an end portion of the first oil groove and inclined at a second angle with respect to the circumferential direction. The first angle is formed relatively greater than the second angle.

9 Claims, 3 Drawing Sheets

FLUID DYNAMIC BEARING MOTOR

BACKGROUND OF THE INVENTION

This application claims the priority of Korean Patent Application No. 2003-78041, filed on Nov. 5, 2003, in the Korean Intellectual Property Office, the disclosure of which is incorporated herein in its entirety by reference.

1. Field of the Invention

The present invention relates to a fluid dynamic bearing motor, and more particularly, to a fluid dynamic bearing motor which can improve a load support force of a fluid dynamic bearing and effectively prevent leakage of oil.

2. Description of the Related Art

A fluid dynamic bearing motor typically has an oil gap formed between a rotor and a stator of the motor. The oil gap is filled with oil having a predetermined viscosity and the oil is compressed as the rotor rotates so that fluid dynamic pressure is generated to rotatably support the rotor. Also, to increase the fluid dynamic pressure, an oil groove is formed in surfaces of the rotor and the stator forming the oil gap and facing each other.

FIGS. 1 and 2 show an example of the fluid dynamic bearing motor. Referring to FIGS. 1 and 2, the fluid dynamic bearing motor that is of a shaft rotating type includes a stator constituted by a housing 10, a sleeve 20, and a core 30, and a rotor constituted by a shaft 40, a hub 50, and a magnet 60.

The sleeve 20 has a hollow at a center thereof in which the shaft 40 is inserted to be capable of rotating. An oil groove 22 for generating fluid dynamic pressure is formed in an inner circumferential surface 21 of the sleeve 20. In particular, a thrust 70 having a ring type disc shape is provided at an inner circumferential portion of a lower end of the sleeve 20, corresponding to a lower end portion of the shaft 40, capable of rotating with the shaft 40. The core 30 around which a coil is wound is fixed at a center portion inside the housing 10. A groove (not shown) for generating the fluid dynamic pressure is formed in upper and lower surfaces of the thrust 70 so that the fluid dynamic pressure is generated in an axial direction.

The lower end portion of the sleeve 20 is blocked from the outside as the inner circumferential portion is shielded by a cover plate 80. The thrust 70 contacts the upper side of the cover plate 80 to be capable of rotating. The hub 50 is integrally coupled to the upper end of the shaft 40 which is inserted in the inner circumferential portion of the sleeve 20 capable of pivoting. The hub 50 has a shape of a cap having an open bottom side. The magnet 60 is installed on an inner circumferential surface of an extended end portion of the hub 50, to face an outer circumferential surface of the core 30.

In the above configuration, a fine oil gap is formed between the inner circumferential surface of the sleeve 20 and each of the shaft 40 and the thrust 70. The oil gap is filled with oil having a predetermined viscosity. As the oil in the oil gap converges into the oil groove 22 of the sleeve 20 and the groove of the thrust 70 for generating the fluid dynamic pressure, when the shaft 40 rotates, the oil gap is always maintained uniformly so that the shaft 40 can be stably driven.

In the conventional shaft rotating type fluid dynamic bearing motor configured as above, when external power is applied to the core 30, the hub 50 having the magnet 60 attached thereto rotates by an electromagnetic force generated between the core 30 and the magnet 60. Accordingly, the shaft 40 coupled to the hub 50 rotates at the same time.

During operation of the motor, the shaft 40 inserted in the inner circumferential portion of the sleeve 20 can smoothly rotate without contacting the inner circumferential surface of the sleeve 20 by the fluid dynamic pressure generated between the oil groove 22 formed in the inner circumferential surface 21 of the sleeve 20 and a groove (not shown) formed in an outer circumferential surface of the shaft 40.

However, the conventional fluid dynamic bearing motor configured as above has the following drawbacks.

First, the oil groove 22 of the fluid dynamic bearing simultaneously performs functions of supporting a load of the rotor and preventing leakage of the oil, by increasing the pressure of the oil during the rotation of the rotor. To increase the load support force, it is advantageous to increase an angle A of the oil groove 22 in view of the dynamics. In contrast, to prevent leakage of the oil, it is advantageous to decrease the angle A. However, since the oil groove 22 is typically formed at a predetermined angle, the improvement of the load support force and the prevention of leakage of the oil cannot be performed simultaneously and effectively.

Second, as shown in FIG. 2, since the direction of flow of the oil in the oil gap and an end portion 22a of the oil groove 22 is parallel to the direction of rotation of the shaft 40, an area whose pressure (negative pressure) is less than the atmospheric pressure is formed narrow in the end portion area of the oil groove 22. As a result, the oil leaks due to high internal pressure in the oil gap.

SUMMARY OF THE INVENTION

To solve the above and/or other problems, the present invention provides a fluid dynamic bearing motor in which the structure of an oil groove is improved so that a load support force of a rotor is improved and simultaneously leakage of oil is prevented.

The present invention provides a fluid dynamic bearing motor having an improved oil groove which can reduce leakage of oil due to high internal pressure of a fluid dynamic bearing portion during the operation of the motor.

According to an aspect of the present invention, there is provided a fluid dynamic bearing motor in which a rotor is rotatably supported by forming an oil gap between the rotor and a stator to form a fluid dynamic pressure bearing and a plurality of oil grooves are formed in a surface of the rotor or stator forming the oil gap and facing each other, wherein the oil grooves comprise a first oil groove inclined at a first angle with respect to a circumferential direction, and a second oil groove extending from an end portion of the first oil groove and inclined at a second angle with respect to the circumferential direction, wherein the first angle is formed relatively greater than the second angle.

An angle of an inlet side of the second oil groove where oil flows in is inclined at an angle between 45°–180° with respect to the circumferential direction.

The stator comprises a housing, a sleeve fixed at a center portion of the housing and having a shaft hole formed at a center portion of the sleeve, and a core fixed to a portion around a center portion of the housing and having a coil wound around the core, and the rotor comprises a shaft coupled to the shaft hole capable of rotating, and a hub fixed to an upper end portion of the shaft and having a magnet attached to an inner circumferential surface of the hub and generating an electromagnetic force by an interaction with the core.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
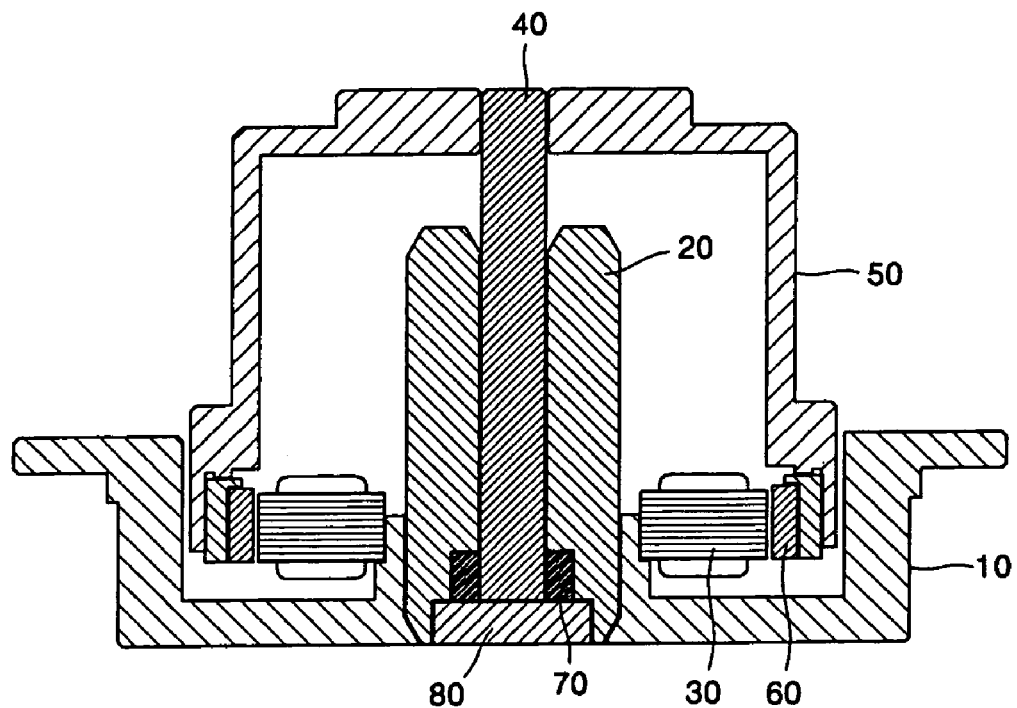
FIG. 1 is a cross-sectional view illustrating the conventional fluid dynamic bearing motor.
Figure 2:
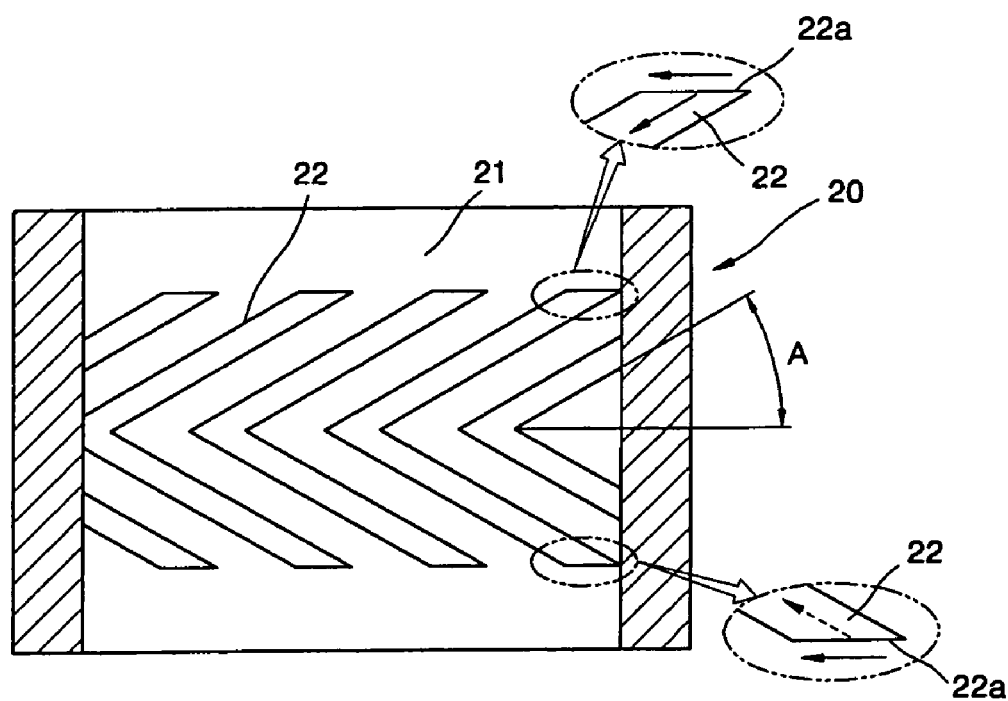
FIG. 2 is a cross-sectional view illustrating an oil groove formed in an inner circumferential surface of the sleeve used in the motor of FIG. 1.
Figure 3:
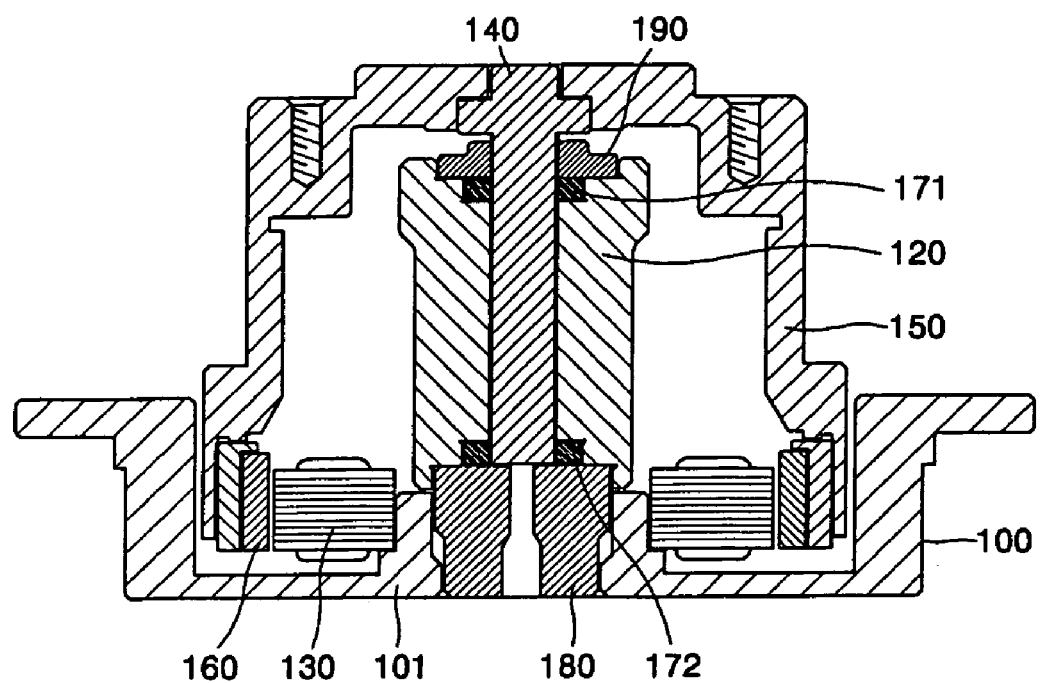
FIG. 3 is a cross-sectional view illustrating a fluid dynamic bearing motor according to an embodiment of the present invention.

Referring to FIG. 3, a fluid dynamic bearing motor according to an embodiment of the present invention has a structure in which a rotor rotating with respect to a stator is supported by a fluid dynamic bearing.

The stator includes a housing 100, a sleeve 120 fixed at a center portion of the housing 100 and having a shaft hole formed at the center portion thereof, and a core 130 fixed to a portion around the center portion of the housing 100 and having a coil wound therearound.

The rotor includes a shaft 140 coupled to the shaft hole capable of rotating while forming an oil gap and a hub 150 fixed to an upper end portion of the shaft 140 and having a magnet 160 attached to an inner circumferential surface of the hub 150 and generating an electromagnetic force by an interaction with the core 130.

Upper and lower thrust plates 171 and 172 are circular and coupled to the upper and lower portions of the shaft 140, respectively, and form fluid dynamic pressure with the sleeve 120 to support the rotor in a thrust direction. A hollow flange 101 extending inwardly and having the core 130 fixed to an outer circumferential surface thereof is formed at the center portion of the housing 100. A cover block 180 supporting a lower end portion of the shaft 140, the lower thrust plate 120, and a lower end portion of the sleeve 120 is coupled to a hollow of the flange 101. A fluid dynamic cover 190 is fixed to an upper end of an inner circumferential portion of the sleeve. 120 to increase internal pressure of a journal portion and prevent leakage of oil. The shaft 140 is rotatably coupled to the fluid dynamic cover 190 and forms an oil gap with the upper surface of the upper thrust plate 171. A plurality of inclined grooves (not shown) are formed in an inner circumferential portion of the fluid dynamic cover 190 at a predetermined interval. When the shaft 140 rotates, the fluid dynamic cover 190 guides the oil toward the inclined grooves so that the leakage of oil is prevented and simultaneously the internal pressure is increased, to stably maintain the generation of fluid dynamic pressure.

Figure 4:
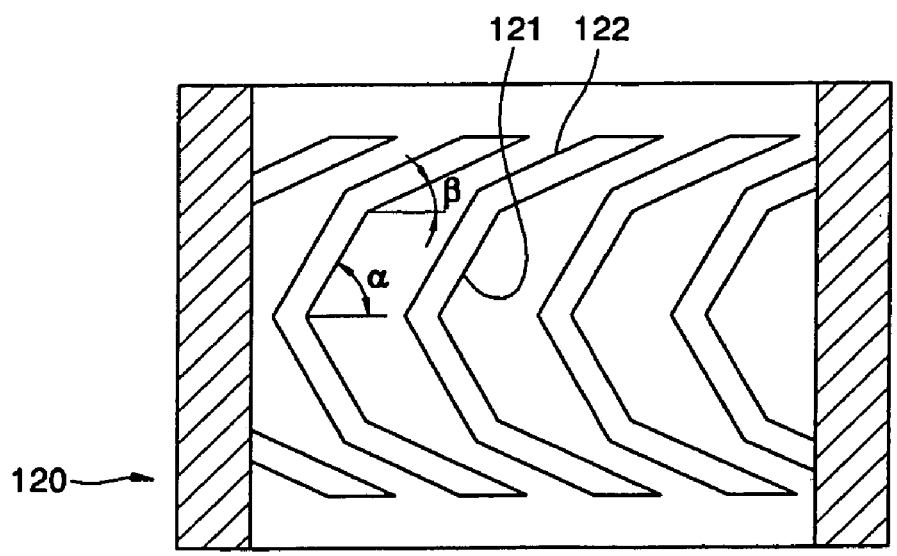
FIGS. 4 through 6 are cross-sectional views illustrating oil grooves formed in an inner circumferential surface of a sleeve used in the motor of FIG. 3.

A plurality of oil grooves are formed, as shown in FIG. 4, in the inner circumferential surface of the sleeve 120 which forms the oil gap with the shaft 140. Each of the oil grooves includes a first oil groove 121 inclined at a first angle $\alpha$ with respect to a circumferential direction and a second oil groove 122 extending from an end portion of the first oil groove 121 and inclined at a second angle $\beta$ with respect to the circumferential direction. The first angle $\alpha$ is greater than the second angle $\beta$. Thus, the first oil groove 121 having a relatively larger first angle $\alpha$ generates relatively greater fluid dynamic pressure to increase a load support force. The second oil groove 122 having a relatively smaller second angle $\beta$ improves an effect of absorbing the oil disposed around the second oil groove 122 so that the leakage of oil is prevented.

Figure 5:
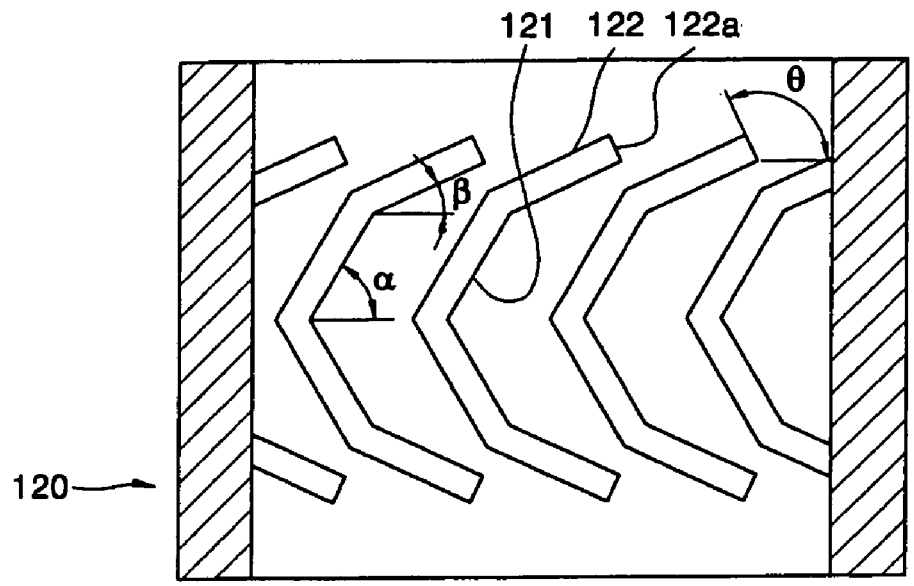
Figure 6:
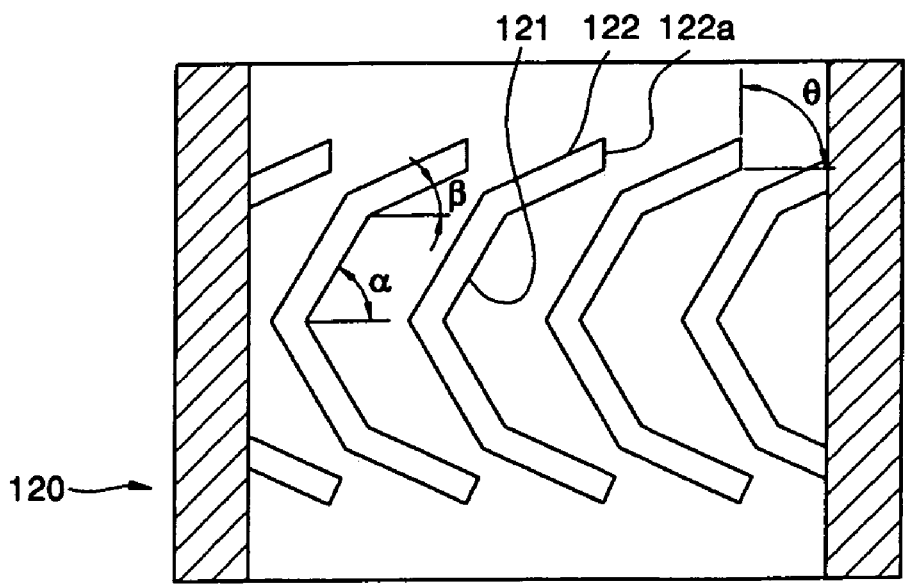

As shown in FIGS. 5 and 6, an angle $\theta$ of an inlet side 122a of the second oil groove 122 into which oil flows in is inclined at an angle between 45°–180° with respect to the circumferential direction.

A factor related to the leakage of oil of the fluid dynamic bearing is the distribution of negative pressure formed around the oil groove. The negative area is effectively formed as the angle of the oil groove is small. Thus, as the angle of the second oil groove 122 is smaller, an effect of preventing the leakage of oil is more improved.

The leakage of oil generated during driving can be anticipated from the distribution of the negative pressure in an atmospheric pressure boundary area of the second oil groove 122. The prevention of the leakage of oil is made easy as the negative pressure is distributed widely and strongly. According to experiments by the present inventor, as the second angle $\beta$ is smaller, the negative pressure is distributed widely and strongly.

The maximum pressure is generated in an area of an inner end portion of the first oil groove 121 and load support capability is determined by the pressure distribution of the area. In the pressure distribution of the area, since pressure is generated greatly as the first angle $\alpha$ of the first oil groove 121 is larger, the load support capability is improved as the first angle $\alpha$ is larger.

In the present embodiment, the oil groove consisting of the first oil groove 121 and the second oil groove 122 are symmetrically formed with respect to an angle reference line and a plurality of the oil grooves are formed at a predetermined interval. In this case, the greatest fluid dynamic pressure is generated around the angle reference line.

In the fluid dynamic bearing motor configured as above, when power is applied to the core 130, the rotor consisting of the shaft 140, the hub 150, and the magnet 160 relatively rotates with respect to the stator consisting of the housing 100, the sleeve 120, and the core 130.

The oil in the oil gap between the sleeve 120 that is fixed and the shaft 140 that is rotating converges into the oil grooves 121 and 122 and generates high pressure, thus forming a fluid dynamic bearing. Also, a fluid dynamic bearing in a thrust direction is formed between the upper and lower thrust plates 171 and 172 and the sleeve 120. Thus, the shaft 140 rotates smoothly by the fluid dynamic bearing in the thrust direction and a fluid dynamic bearing in a radial direction between the sleeve 120 and the shaft 140.

The oil groove consists of the first oil groove 121 inclined at the first angle $\alpha$ with respect to a circumferential direction and the second oil groove 122 extending from an end portion of the first oil groove 121 and inclined at the second angle $\beta$ with respect to the circumferential direction. The first angle $\alpha$ is formed relatively greater than the second angle $\beta$ so that the leakage of oil is effectively prevented and simultaneously the fluid dynamic pressure is improved to increase a load support force.

By forming the angle $\theta$ of the inlet side 122a of the second oil groove 122 greater than that according to the conventional technology, the area where negative pressure is distributed is increased so that the leakage of oil is reduced in spite of the high internal pressure.

While this invention has been particularly shown and described with reference to preferred embodiments thereof, it will be understood by those skilled in the art that various changes in form and details may be made therein without departing from the spirit and scope of the invention as defined by the appended claims.

As described above, the present invention has the following merits.

First, the oil groove formed in the surfaces of the sleeve and the shaft forming the oil gap and facing each other has the first oil groove and the second groove. The angle of the first oil groove is formed greater than the second oil groove. Thus, the leakage of oil is effectively prevented and simultaneously the fluid dynamic pressure is improved so that the load support force is increased.

Second, unlike the angle of the inlet side of the second oil groove which is formed parallel to the circumferential direction, the angle is formed at an angle between 45°–180° with respect to the circumferential direction so that pressure of an area at the end portion of the oil groove is increased and the leakage of oil due to the internal pressure is effectively prevented.

What is claimed is:

1. A fluid dynamic bearing motor in which a rotor is rotatably supported by forming an oil gap between the rotor and a stator to form a fluid dynamic pressure bearing and a plurality of oil grooves are formed in a surface of the rotor or stator forming the oil gap and facing each other, wherein the oil grooves comprise:
    a first oil groove inclined at a first angle with respect to a circumferential direction; and
    a second oil groove extending from an end portion of the first oil groove and inclined at a second angle with respect to the circumferential direction, wherein the first angle is formed relatively greater than the second angle.

2. The fluid dynamic bearing motor of claim 1, wherein an angle of an inlet side of the second oil groove where oil flows in is inclined at an angle between 45.degree.–180.degree. with respect to the circumferential direction.

3. The fluid dynamic bearing motor of claim 2, wherein the stator comprises:
    a housing;
    a sleeve fixed at a center portion of the housing and having a shaft hole formed at a center portion of the sleeve; and
    a core fixed to a portion around a center portion of the housing and having a coil wound around the core, and the rotor comprises:
    a shaft coupled to the shaft hole capable of rotating; and
    a hub fixed to an upper end portion of the shaft and having a magnet attached to an inner circumferential surface of the hub and generating an electromagnetic force by an interaction with the core.

4. The fluid dynamic bearing motor of claim 1, wherein the stator comprises:
    a housing;
    a sleeve fixed at a center portion of the housing and having a shaft hole formed at a center portion of the sleeve; and
    a core fixed to a portion around a center portion of the housing and having a coil wound around the core, and the rotor comprises:
    a shaft coupled to the shaft hole capable of rotating; and
    a hub fixed to an upper end portion of the shaft and having a magnet attached to an inner circumferential surface of the hub and generating an electromagnetic force by an interaction with the core.

5. A fluid dynamic bearing motor comprising:
    a housing;
    a sleeve positioned within the housing and having a shaft hole;
    a rotor coupled to the shaft hole and rotatably supported within, the shaft and rotor configured to include a gap therebetween;
    a plurality of oil grooves configured to face the gap and including a first oil groove at a first angle with respect to a circumferential direction and a second oil groove extending from an end portion of the first oil groove and oriented at a second angle with respect to the circumferential direction, wherein the first angle is formed relatively greater than the second angle, the second oil groove including an inlet side oriented at a predetermined angle with respect to the circumferential direction.

6. The fluid dynamic bearing motor of claim 5 wherein the predetermined angle is between and including 45° and 90°.

7. The fluid dynamic bearing motor of claim 5 wherein the predetermined angle is between and including 90° and 180°.

8. The fluid dynamic bearing motor of claim 5 wherein the predetermined angle is between and including 45° and 180°.

9. A fluid dynamic bearing motor comprising:
    a housing;
    a sleeve positioned within the housing and having a shaft hole;
    a rotor coupled to the shaft hole and rotatably supported within, the shaft and rotor configured to include a gap therebetween;
    a plurality of oil grooves configured to face the gap and including a first oil groove at a first angle with respect to a circumferential direction and a second oil groove extending from an end portion of the first oil groove and oriented at a second angle with respect to the circumferential direction, wherein the first angle is formed relatively greater than the second angle, the second oil groove including an inlet side oriented at an angle between 45° and 180° with respect to the circumferential direction.

* * * * *